US010513768B2

(12) United States Patent
Lass et al.

(10) Patent No.: US 10,513,768 B2
(45) Date of Patent: Dec. 24, 2019

(54) COINAGE CLADDING ALLOY AND PROCESSING FOR MAKING COINAGE CLADDING ALLOY

(71) Applicant: GOVERNMENT OF THE UNITES STATES OF AMERICA, AS REPRESENTED BY THE SECRETARY OF COMMERCE, Gaithersburg, MD (US)

(72) Inventors: Eric A. Lass, Montgomery Village, MD (US); Mark R. Stoudt, Germantown, MD (US); Carelyn Campbell, Germantown, MD (US); Tsineng Tony Ying, Silver Spring, MD (US)

(73) Assignee: GOVERNMENT OF THE UNITED STATES OF AMERICA, AS REPRESENTED BY THE SECRETARY OF COMMERCE, Gaithersburg, MD (US)

(*) Notice: Subject to any disclaimer, the term of this patent is extended or adjusted under 35 U.S.C. 154(b) by 290 days.

(21) Appl. No.: 15/297,393

(22) Filed: Oct. 19, 2016

(65) Prior Publication Data

US 2018/0105913 A1 Apr. 19, 2018

(51) Int. Cl.

| | |
|---|---|
| ***C22F 1/08*** | (2006.01) |
| ***C22C 9/04*** | (2006.01) |
| ***C22C 1/02*** | (2006.01) |
| ***B22D 21/00*** | (2006.01) |
| ***B32B 15/01*** | (2006.01) |
| ***A44C 21/00*** | (2006.01) |

(52) U.S. Cl.
CPC ................ *C22F 1/08* (2013.01); *A44C 21/00* (2013.01); *B22D 21/005* (2013.01); *B32B 15/01* (2013.01); *C22C 1/02* (2013.01); *C22C 9/04* (2013.01)

(58) Field of Classification Search
CPC ........................................................ C22F 1/08
See application file for complete search history.

(56) References Cited

U.S. PATENT DOCUMENTS

| | | | | |
|---|---|---|---|---|
| 4,003,715 A * | 1/1977 | Cascone | ............. | B23K 35/302 219/146.32 |
| 4,147,568 A | 4/1979 | Marechal | | |
| 4,525,434 A * | 6/1985 | Morikawa | .............. | B32B 15/01 428/674 |
| 5,997,663 A | 12/1999 | Kita et al. | | |
| 6,340,446 B1 | 1/2002 | Kita et al. | | |
| 2010/0061884 A1 | 3/2010 | Clark et al. | | |
| 2013/0189540 A1 | 7/2013 | McDaniel et al. | | |
| 2014/0112822 A1 | 4/2014 | Tanaka et al. | | |
| 2016/0068940 A1 | 3/2016 | Lass | | |

* cited by examiner

*Primary Examiner* — Jophy S. Koshy
(74) *Attorney, Agent, or Firm* — Office of Chief Counsel for National Institute of Standards and Technology

(57) ABSTRACT

A coinage cladding alloy for coinage includes nickel present in an amount from 5 wt. % to 7 wt. %, based on a total weight of the coinage cladding alloy; zinc present in an amount from 21 wt. % to 29 wt. %, based on the total weight of the coinage cladding alloy; manganese present in an amount from 12 wt. % to 16 wt. %, based on a total weight of the coinage cladding alloy; copper; an electrical conductivity from 2% International Annealed Copper Standard (IACS) to 3% IACS; and a color comprising a yellowness vector b* that is from 2 to 10, based on a CIE L*a*b* color space and determined in accordance with ASTM Standard E308-15 (2015).

9 Claims, 12 Drawing Sheets

COINAGE CLADDING ALLOY AND PROCESSING FOR MAKING COINAGE CLADDING ALLOY

STATEMENT REGARDING FEDERALLY SPONSORED RESEARCH

This invention was made with United States Government support from the National Institute of Standards and Technology. The Government has certain rights in the invention.

BRIEF DESCRIPTION

Disclosed is a coinage cladding alloy for coinage comprising: nickel present in an amount from 5 wt. % to 7 wt. %, based on a total weight of the coinage cladding alloy; zinc present in an amount from 21 wt. % to 29 wt. %, based on the total weight of the coinage cladding alloy; manganese present in an amount from 12 wt. % to 16 wt. %, based on a total weight of the coinage cladding alloy; copper; an electrical conductivity from 2% International Annealed Copper Standard (IACS) to 3% IACS measured in accordance with ASTM E1004-09 (2009); and a color comprising a yellowness vector b* that is from 2 to 10, based on a CIE L*a*b* color space and determined in accordance with ASTM Standard E308-15 (2015).

Further disclosed is a process for making the coinage cladding alloy, the process comprising: heating an alloying composition to a first temperature that is greater than or equal to an annealing temperature to form an annealing alloy, the alloying composition comprising: nickel present in an amount from 5 wt. % to 7 wt. %, based on a total weight of the alloying composition; zinc present in an amount from 21 wt. % to 29 wt. %, based on the total weight of the alloying composition; manganese present in an amount from 12 wt. % to 16 wt. %, based on a total weight of the alloying composition; and copper; and quenching, by cooling the annealing alloy from the first temperature to a second temperature that is less than the annealing temperature, under a condition effective to form the coinage cladding alloy comprising the electrical conductivity and the yellowness vector b*.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
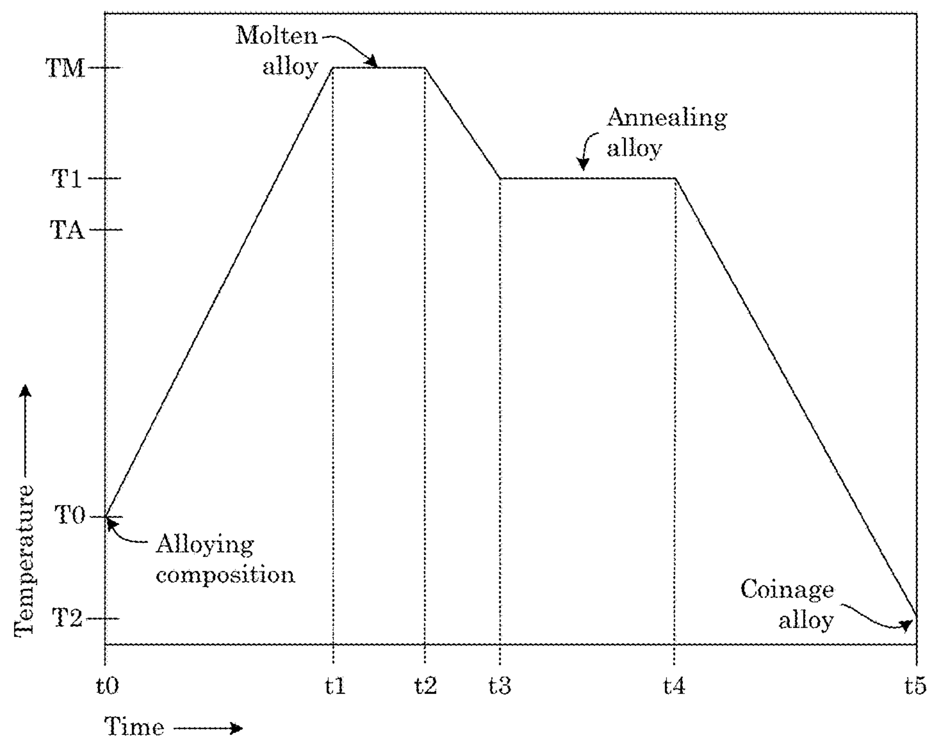
FIG. 1 shows a graph of temperature versus time for forming a coinage cladding alloy that includes a selected electrical conductivity.

A detailed description of one or more embodiments is presented herein by way of exemplification and not limitation.

It has been discovered that a coinage cladding alloy herein has unexpected and beneficial electrical, chemical, and physical properties suitable as a substitute for a cupronickel alloy for coins used in commerce, particularly coins in the United States that include the cupronickel alloy, particularly in a cladding material in so-called sandwich coins.

In an embodiment, the coinage cladding alloy includes a plurality of transition metal elements, e.g., nickel, copper, zinc, manganese, or the like. The coinage cladding alloy has a property effective for use of the coinage cladding alloy in currency, e.g., as cladding in a coin. In a particular embodiment, the coinage cladding alloy includes nickel, copper, manganese, and zinc in amount effective such that the coinage cladding alloy has an electrical conductivity compatible with disposition as cladding in a coin such that the coin is compatible with a coin vending apparatus, a coin counter, or a coin identification machine.

In some embodiments, the coinage cladding alloy has an electrical conductivity from 2% International Annealed Copper Standard (IACS) to 3% IACS measured in accordance with ASTM E1004-09 (2009). According to an embodiment, the coinage cladding alloy has a disordered crystalline phase wherein atoms of the nickel, cooper, manganese, and zinc are randomly arranged in the disordered crystalline phase at room temperature in a post-annealed state. In some embodiments, a plurality of phases is present in the coinage cladding alloy. In a certain embodiment, the plurality of phases includes face centered cubic.

In some embodiments, the coinage cladding alloy has an ordered crystalline phase wherein atoms of the nickel, cooper, manganese, and zinc are arranged in the ordered crystalline phase at room temperature in a post-annealed state. In certain embodiments, a phase is present in the coinage cladding alloy that includes face centered cubic.

Materials used in a manufacture of the coinage cladding alloy can contain a low level of an impurity such as a metal-, carbon-, or nitrogen-containing impurity. Such impurity can be present in the coinage cladding alloy described herein, provided that the impurity is not present in an amount that significantly adversely affects the desired properties of the coinage cladding alloy, in particular the electrical conductivity of the coinage cladding alloy. Impurities can be present in the coinage cladding alloy in a minor amount due to, e.g., leaching from contact with manufacturing equipment, uptake during processing of the coinage cladding alloy, or components in an alloying composition that is used to make the coinage cladding alloy.

The coinage cladding alloy contains nickel in an amount from 5 weight percent (wt. %) to 7 wt. %, based on a total weight of the coinage cladding alloy. In an embodiment, the coinage cladding alloy contains 6 wt. % nickel, based on a total weight of the coinage cladding alloy.

The coinage cladding alloy contains zinc in an amount from 23 wt. % to 27 wt. %, based on a total weight of the coinage cladding alloy. In an embodiment, the coinage cladding alloy contains 25 wt. % zinc, based on a total weight of the coinage cladding alloy.

The coinage cladding alloy can contain manganese in an amount from 12 wt. % to 16 wt. %. In an embodiment, coinage cladding alloy contains 14 wt. % manganese, based on a total weight of the coinage cladding alloy.

The coinage cladding alloy contains copper in an amount from 50 wt. % to 60 wt. %, based on a total weight of the coinage cladding alloy. In an embodiment, coinage cladding alloy contains 55 wt. % copper, based on a total weight of the coinage cladding alloy.

The coinage cladding alloy can contain other elements such as Fe, Pb, P, or S, in an amount from 0 wt. % to 1.0 wt. %, specifically less than or equal to 0.5 wt. %, based on a total weight of the coinage cladding alloy.

According to an embodiment, the coinage cladding alloy contains nickel in an amount from 5 wt. % to 7 wt. %, zinc in an amount from 21 wt. % to 29 wt. %, manganese in an amount of 12 wt. % to 16 wt. %, based on the total weight of the coinage cladding alloy, with the balance of the total weight being copper. That is, copper is present in an amount as a balance of the total weight of the coinage cladding alloy.

According to an embodiment, the coinage cladding alloy contains nickel in an amount from 5 wt. % to 7 wt. %, zinc in an amount from 21 wt. % to 29 wt. %, manganese in an amount of 12 wt. % to 16 wt. %, and copper in an amount from 50 wt. % to 62 wt. %, based on the total weight of the coinage cladding alloy, with the balance of the total weight being copper. That is, copper is present in an amount as a balance of the total weight of the coinage cladding alloy.

In a particular embodiment, the coinage cladding alloy includes 6 wt. % Ni, 25.0 wt. %, Zn, 14.0 wt. % Mn, and 55.0 wt. % Cu, based on the total weight of the coinage cladding alloy. According to an embodiment, the coinage cladding alloy is referred to as C99H and includes Ni, Cu, Mn, and Zn that are present in an amount from 5 wt. % to 7 wt. % Ni, zinc in an amount from 21 wt. % to 29 wt. %, manganese in an amount of 12 wt. % to 16 wt. %, copper in an amount from 50 wt. % to 60 wt. %, and less than 0.2 wt. % of the impurity, based on a total weight of the coinage cladding alloy, with the balance of the total weight being copper.

The coinage cladding alloy can contain less than 1 weight percent (wt. %), less than 0.5 wt. %, or less than 0.1 wt. % of materials (e.g., the impurity) other than the nickel, copper, manganese, and zinc, based on the total weight of the coinage cladding alloy, wherein a lower bound is 0 wt. % of the impurity.

An exemplary composition of the coinage cladding alloy is shown in Table 1.

TABLE 1

| Element | Amount (wt. %, based on total weight of coinage cladding alloy) |
|---|---|
| Ni | 5.5-6.5 |
| Zn | 23-27 |
| Mn | 13.0-15.0 |
| Impurity | <0.2 |
| Cu | balance |

According to an embodiment, the coinage cladding alloy can include a nominal composition of Cu-6Ni-25Zn-14Mn by mass.

In an embodiment, selected amounts of nickel, copper, manganese, and zinc are combined as an alloying composition. The alloying composition is heated to a temperature that is effective to produce a molten alloy of the alloying composition. A pure metal of the nickel, copper, zinc, and manganese can be combined as the alloying composition and then melted to form the molten alloy. The metal can be a powder, pellet, wire, shot, ingot, and the like; or in the form of scrap metal alloy where appropriate amounts of nickel, copper, zinc, and manganese are combined with the scrap alloy to produce the appropriate alloying composition.

According to an embodiment, a process for making the coinage cladding alloy includes heating an alloying composition to a first temperature that is greater than or equal to an annealing temperature to form an annealing alloy, the alloying composition including: nickel present in an amount from 5 wt. % to 7 wt. %, based on a total weight of the alloying composition; zinc present in an amount from 21 wt. % to 29 wt. %, based on the total weight of the alloying composition; manganese present in an amount from 12 wt. % to 16 wt. %, based on a total weight of the alloying composition; and copper; and quenching, by cooling the annealing alloy from the first temperature to a second temperature that is less than the annealing temperature, under a condition effective to form the coinage cladding alloy including the electrical conductivity and the yellowness vector b*.

In the process for making the coinage cladding alloy, heating the alloying composition can include melting the alloying composition to form a molten alloy, and the process further can include cooling the molten alloy to form the annealing alloy. The annealing temperature can be from 600° C. to 900° C., specifically from 700° C. to 800° C., and more specifically from 725° C. to 775° C. It is contemplated that the condition includes a cooling rate that is greater than or equal to air cooling from the first temperature to the second temperature. In some embodiments, the cooling rate is provided by water quenching the annealing alloy at a rate from 1° C. per second (° C./s) to 1000° C., specifically from 10° C. to 1000° C. In some embodiments, the cooling rate is less than or equal to air cooling from the first temperature to the second temperature. In certain embodiments, the cooling rate is provided by air quenching the annealing alloy at a rate from 1° C. per second (° C./s) to 1000° C., specifically from 1° C. to 100° C.

The process for making the coinage cladding alloy further can include casting the molten alloy to form the annealing alloy in a solid state.

The process can further include subjecting the coinage cladding alloy to thermo-mechanical processing to form an article such as a sheet, ingot, blank, coin, and the like. Exemplary, thermo-mechanical processing includes rolling, forging, cutting, stamping, pressing, and the like.

Melting the alloy composition occurs, e.g., at a temperature greater than or equal to a melting temperature of the nickel, copper, manganese, or zinc. Further, casting includes decreasing the temperature of the molten alloy below its melting point to form the annealing alloy. Casting can include cooling a container in which the molten alloy is disposed during melting the alloy composition. In some embodiments, casting includes disposing the molten alloy in a mold to form the annealing alloy and the coinage cladding alloy at a temperature less than the melting point of the annealing alloy.

With the molten alloy formed from the alloying composition, the process includes cooling the molten alloy to a first temperature that is greater than or equal to an annealing temperature to form the annealing alloy; and quenching, by cooling the annealing alloy from the first temperature to a second temperature that is less than the annealing temperature, under a condition effective to form the coinage cladding alloy.

In an embodiment, the annealing temperature is selected such that the annealing alloy is subjected to heat that is sufficient to produce a substantially disordered phase of the annealing alloy above the annealing temperature as the molten alloys solidifies to form the annealing alloy. In some embodiments, the molten alloy can be cooled below the annealing temperature and then reheated to a temperature greater than the annealing temperature to form the annealing alloy. Here, the annealing alloy eventually can be transformed into the coinage cladding alloy having the disordered crystalline phase as the annealing alloy is cooled below the annealing temperature. The annealing temperature can depend on the elemental composition of the annealing alloy (e.g., provided by the alloying composition) and can be from 600° C. to 900° C., specifically from 700° C. to 800° C., and more specifically from 725° C. to 775° C. In an embodiment, the condition for quenching the temperature of the annealing composition to less than the annealing temperature includes a cooling rate that is greater than or equal to that cooling rate provided by air cooling from the first temperature to the second temperature. In a certain embodiment, the cooling rate is greater than or equal to the cooling rate of water quenching from the first temperature to the second temperature to form the coinage cladding alloy from the annealing alloy. In some embodiments, the cooling rate is from 1° C./s to 1000° C./s, specifically from greater than or equal to 10° C./s. It is contemplated that the cooling rate can be from $10^{4}$° C./s to $10^{5}$° C./s for certain articles that include the coinage cladding alloy.

In an embodiment, the coinage cladding alloy has a face centered cubic phase. Here, the annealing temperature is selected such that the annealing alloy is subjected to heat that is sufficient to produce the face centered cubic phase in the annealing alloy above the annealing temperature as the molten alloys solidifies to form the annealing alloy. Thereafter, the annealing alloy is cooled below the annealing temperature at a rate to form the coinage cladding alloy having the face centered cubic phase. The annealing temperature can depend on the elemental composition of the annealing alloy (e.g., provided by the alloying composition) and can be from 600° C. to 900° C., specifically from 700° C. to 800° C., and more specifically from 725° C. to 775° C. In an embodiment, the condition for quenching the temperature of the annealing composition to less than the annealing temperature includes a cooling rate that is greater than or equal to that cooling rate provided by air cooling from the first temperature to the second temperature. In a certain embodiment, the cooling rate is greater than or equal to the cooling rate of water quenching from the first temperature to the second temperature to form the coinage cladding alloy from the annealing alloy. In some embodiments, the cooling rate is from 1° C./s to 1000° C./s, specifically from greater than or equal to 10° C./s. It is contemplated that the cooling rate can be from $10^{4}$° C./s to $10^{5}$° C./s for certain articles that include the coinage cladding alloy.

With reference to FIG. 1, as used herein, the term "cooling rate" refers to a rate of a decrease in temperature of the annealing alloy from first temperature T1 (that is greater than (as in FIG. 1) or equal to annealing temperature TA) to second temperature T2 at which the coinage cladding alloy is formed. FIG. 1 shows a graph of temperature versus time for forming the coinage cladding alloy from the alloying composition via the molten alloy and the annealing alloy.

At time t0, the alloying composition is at temperature T0. From time t0 to time t1, the alloying composition is heated from temperature T0 to melting temperature TM to melt the components of the alloying composition and to form the molten alloy. From time t2 to time t3, the molten alloy is cooled from melting temperature TM to first temperature T1 to form the annealing alloy in a solid state from a fluid state of the molten alloy. From time t4 to time t5, the temperature decreases from first temperature T1 (here, greater than annealing temperature TA) to second temperature T2 as the coinage cladding alloy is formed from the annealing alloy.

In some embodiments, the annealing alloy and the coinage cladding alloy have a same atomic ordering, e.g., first atomic ordering AO1. In certain embodiments, the coinage cladding alloy and the annealing alloy have different atomic orderings, wherein the annealing alloy has first atomic ordering AO1, and the coinage cladding alloy has second atomic ordering AO2. As used herein, "atomic ordering" refers to a location of atoms of copper, nickel, zinc, and manganese, wherein the atomic ordering of the atoms is disordered when the probability of finding an atom of specific type (Cu, Ni, Zn, or Mn) is approximately equal for all atomic positions (lattice sites) in the crystal structure, and the atomic ordering of the atoms is when certain atomic positions are preferred by different atoms (e.g. atomic position A contains nearly all Cu atoms and few Ni, Zn, and Mn atoms; while atomic position B contains almost no Cu atoms and mostly Ni, Zn, and Mn atoms). It will be appreciated that crystallinity is a characteristic of the coinage alloy or annealing alloy that is different from the atomic ordering of the coinage alloy or annealing alloy. With regard to crystallinity, the coinage alloy can be crystalline, wherein the atoms are position in a repeating unit cell such that the crystallinity of the coinage alloy is face centered cubic, body centered cubic, complex body centered cubic (A12 or A13, Mn prototype), $L1_2$ ($Cu_3Au$ prototype), $L1_0$ (CuAu prototype), and the like. Moreover, under certain formation conditions, the coinage alloy can be amorphous or amorphous with crystalline domains.

Figure 2:
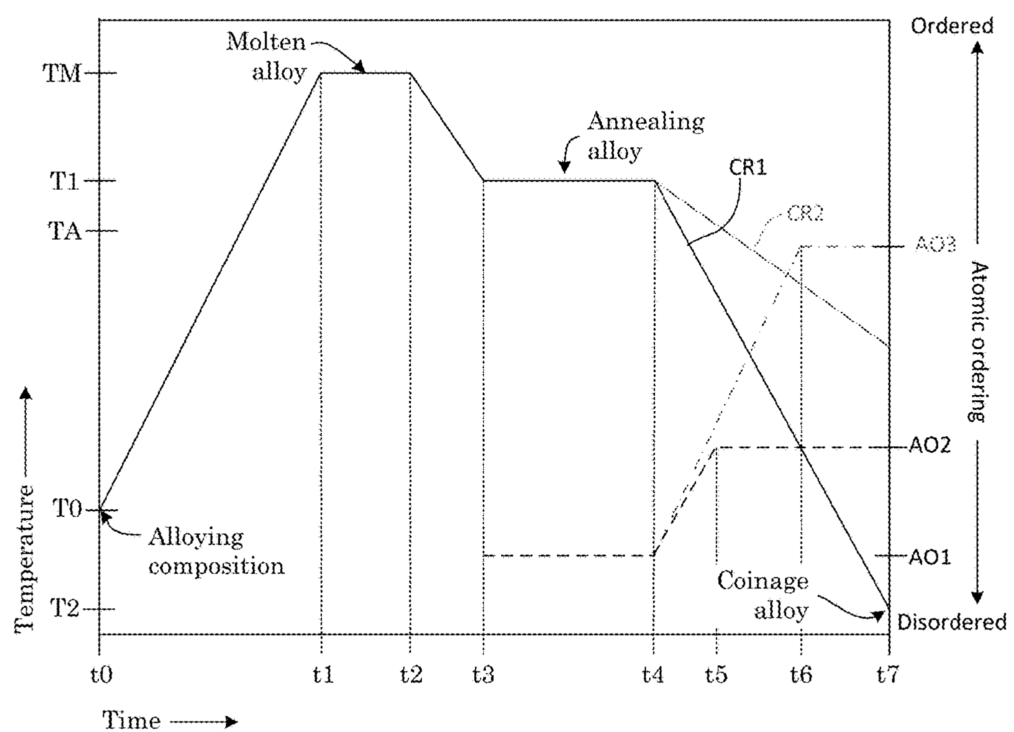
FIG. 2 shows a graph of temperature versus time for forming the coinage cladding alloy that includes the selected electrical conductivity.

In an embodiment, with reference to FIG. 2, a rate of cooling the annealing alloy to the coinage cladding alloy controls the atomic ordering of the atoms of the coinage alloy. Here, the rate of cooling during time t4 to time t7 governs the atomic ordering of the coinage cladding alloy as well as other properties that include, e.g., the electrical conductivity, hardness, color, and the like of the coinage cladding alloy. With reference to FIG. 2, first cooling rate CR1 is greater than second cooling rate CR2. For first cooling rate CR1, quenching the annealing alloy starts at time t4 with the annealing alloy having atomic ordering AO1, which changes to atomic ordering AO2 at time t5 such that the coinage cladding alloy is formed with atomic ordering AO2. For second cooling rate CR2, quenching the annealing alloy starts at time t4 with the annealing alloy having atomic ordering AO1, which changes to atomic ordering AO3 at time t6 such that the coinage cladding alloy is formed with atomic ordering AO3. Here, the annealing alloy between time t3 and time t4 has a greater degree of atomic ordering AO1 than does the coinage cladding alloy (with atomic ordering AO2 at time t7) and also the coinage alloy (with atomic ordering AO3 at time t7). Due to the cooling rate, e.g., first cooling rate CR1 or second cooling rate CR2 and the like, the coinage cladding alloy formed from the alloying composition via the molten alloy and the annealing alloy can be selected to have a tailored atomic ordering, electrical conductivity, color, hardness, or other property or combination thereof.

It is contemplated that quenching includes subjecting the annealing alloy at the first temperature (which is greater than or equal to annealing temperature TA) to a fluid to cool the annealing alloy at a selected cooling rate from the first temperature to below annealing temperature TA to form the coinage cladding alloy.

In an embodiment, the cooling rate is sufficiently rapid such that the coinage cladding alloy is formed with the disordered crystalline phase having a selected atomic ordering. Here, the fluid can be a gas, liquid, or a combination thereof. Exemplary gases include air (including individual components of air (e.g., $N_2$, $O_2$, Ar, $H_2O$, and the like)), noble gases, polyatomic gases (e.g., $H_2$, $CO_2$, and the like), and the like. Exemplary liquids include water, betaine, an oil, and the like. The heat capacity of the fluid can be high such that the fluid can receive a considerable amount of heat from the annealing alloy or coinage cladding alloy during quenching and provide a high quenching rate. Similarly, a volume of the fluid used can be effective to provide a low temperature, heat sink effective to quench rapidly the annealing alloy or coinage cladding alloy such that the coinage cladding alloy attains the disordered crystalline phase. The fluid can be selected to provide a volume or heat capacity to provide an isothermal environment at a selected temperature (e.g., room temperature, or a temperature such as from −20° C. to 100° C.) to which the annealing alloy or coinage cladding alloy is subjected so that the temperature of the annealing alloy can be decreased rapidly from the first temperature (greater than the annealing temperature) to the second temperature (less than the annealing temperature) to provide the coinage cladding alloy prepared with the disordered crystalline phase, selected electrical conductivity, color, or combination thereof.

In an embodiment, the cooling rate is sufficiently slow such that the coinage cladding alloy is formed with an ordered crystalline phase having a selected atomic ordering. Here, the fluid can be a gas, liquid, or a combination thereof. Exemplary gases include air (including individual components of air (e.g., $N_2$, $O_2$, Ar, $H_2O$, and the like)), noble gases, polyatomic gases (e.g., $H_2$, $CO_2$, and the like), and the like. Exemplary liquids include water, betaine, an oil, and the like. The heat capacity of the fluid can be selectively tailored to be sufficiently low such that the fluid can receive heat from the annealing alloy or coinage cladding alloy during quenching and provide a low quenching rate to provide for the ordered atomic ordering. Similarly, a volume of the fluid used can be effective to provide a moderate temperature heat sink to quench slowly the annealing alloy or coinage cladding alloy such that the coinage cladding alloy attains the ordered crystalline phase. The fluid can be selected to provide a volume or heat capacity to provide an isothermal environment at a selected temperature (e.g., room temperature, or a temperature such as from −20° C. to 100° C.) to which the annealing alloy or coinage cladding alloy is subjected so that the temperature of the annealing alloy can be decreased slowly from the first temperature (greater than the annealing temperature) to the second temperature (less than the annealing temperature) to provide the coinage cladding alloy prepared with the ordered crystalline phase, selected electrical conductivity, color, or combination thereof.

In an embodiment, the annealing alloy includes the same elemental composition as the coinage cladding alloy. Without wishing to be bound by theory, due to forming the annealing alloy at the first temperature (which is greater or equal to the annealing temperature of the coinage alloy), the atoms in the annealing alloy are arranged in a disordered phase such as a face-centered cubic phase at the first temperature. Rapidly quenching the annealing alloy from the first temperature to the second temperature does not provide enough time for the atoms to rearrange into an ordered crystalline phase. As a result, the atoms maintain the disordered crystalline phase at the second temperature (and cooler temperatures thereof) in the coinage cladding alloy.

In some embodiments, the atoms in the annealing alloy are arranged in a disordered phase such as a face-centered cubic phase at the first temperature. Slowly quenching the annealing alloy from the first temperature to the second temperature to form the coinage cladding alloy provides enough time for the atoms to rearrange into an ordered crystalline phase. As a result, the atoms rearrange into the ordered crystalline phase at the second temperature (and cooler temperatures thereof) in the coinage cladding alloy.

According to an embodiment, the annealing alloy has a different phase from the coinage cladding alloy, and the annealing alloy has a first electrical conductivity that is different from the electrical conductivity of the coinage cladding alloy. In an embodiment, the annealing alloy and the coinage cladding alloy have substantially identical electrical conductivities. Moreover, the annealing alloy can have a same or different hardness or color as the hardness or color of the coinage cladding alloy.

In an embodiment, the alloying composition is heated and melted to form the molten alloy. The molten alloy is a fluid that is subjected to cooling to solidify to form the annealing alloy. The annealing alloy is subjected to annealing at the first temperature (which is greater than annealing temperature TA of the annealing alloy). At the first temperature, the annealing alloy has a single phase that has a face-centered cubic (FCC) microstructure. In some embodiments, the first temperature is, e.g., greater than 450° C., and the annealing alloy can be maintained at or above annealing temperature TA for a selected time, e.g., from a few minutes to several hours. Processing the annealing alloy includes cooling the annealing alloy rapidly from the annealing temperature to approximately room temperature to form the coinage cladding alloy in the selected phase. Cooling can occur by fast quenching (e.g., water quenching) or another method with a selected cooling rate to provide the coinage cladding alloy in the selected disordered phase.

According to an embodiment, the alloying composition is heated and melted to form the molten alloy. The molten alloy is a fluid that is subjected to cooling to solidify to form the annealing alloy. The annealing alloy is subjected to annealing at the first temperature (which is greater than annealing temperature TA of the annealing alloy). At the first temperature, the annealing alloy has a phase that has a face centered cubic. In some embodiments, the first temperature is, e.g., greater than 700° C., and the annealing alloy can be maintained at or above annealing temperature TA for a selected time, e.g., from a few minutes to several hours. Processing the annealing alloy includes cooling the annealing alloy at selected cooling rate from the annealing temperature to approximately room temperature to form the coinage cladding alloy in the ordered phase. Cooling can occur by slowly quenching (e.g., air quenching) or another method with the selected cooling rate to provide the coinage cladding alloy in the ordered phase.

Processing to form the coinage cladding alloy from the annealing alloy can include cold rolling, warm rolling, air quenching, water quenching, and the like.

In certain embodiments, an electrical conductivity or mechanical property of the coinage cladding alloy is selectively tailored or tuned by providing a rate of quenching the annealing alloy from annealing temperature TA to second temperature T2 to control a degree of atomic-level short-range ordering, e.g., from a high-temperature disordered FCC crystal phase in the annealing alloy to a selected atomic ordering of the coinage cladding alloy obtained by the quenching process, wherein the atomic ordering can be disordered or ordered. It is contemplated that a faster cooling rate provides decreased ordering with the coinage cladding alloy having a higher conductivity and lower hardness mechanical property compared with the annealing alloy. It is further contemplated that a slower cooling rate provides increased ordering on an atomic level and concomitant electrical conductivity (e.g., lower electrical conductivity) and mechanical property (e.g., higher hardness) of the coinage cladding alloy.

Figure 3:
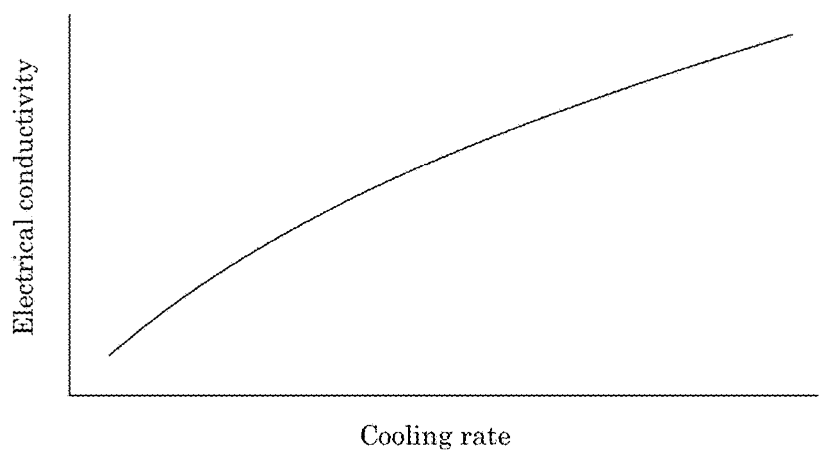
FIG. 3 shows a graph of electrical conductivity versus cooling rate for the coinage cladding alloy.
Figure 4:
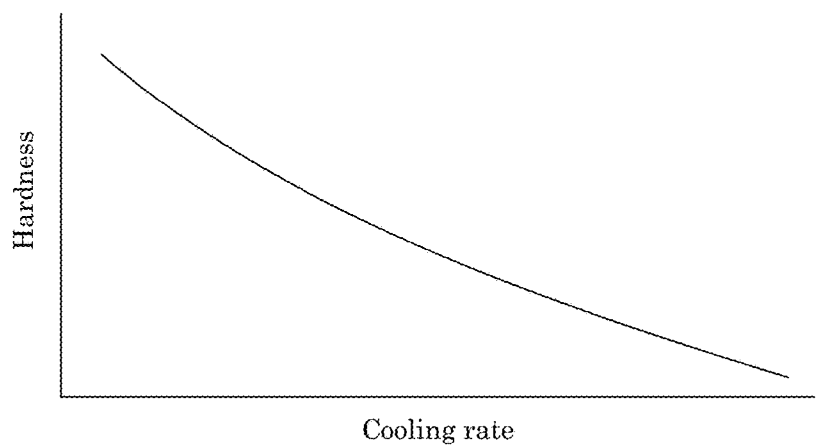
FIG. 4 shows a graph of hardness versus cooling rate for the coinage cladding alloy.

FIG. 3 shows a graph of electrical conductivity of the coinage cladding alloy versus cooling rate of the annealing alloy during formation of the coinage cladding alloy from the annealing alloy. Here, the electrical conductivity of the coinage cladding alloy increases as the cooling rate of the annealing alloy from the first temperature to the second temperature increases. For the hardness of the coinage cladding alloy, FIG. 4 shows a graph of hardness of the coinage cladding alloy versus cooling rate of the annealing alloy during formation of the coinage cladding alloy from the annealing alloy. Here, the hardness of the coinage cladding alloy decreases as the cooling rate (of the annealing alloy) from the first temperature to the second temperature increases.

Figure 5:
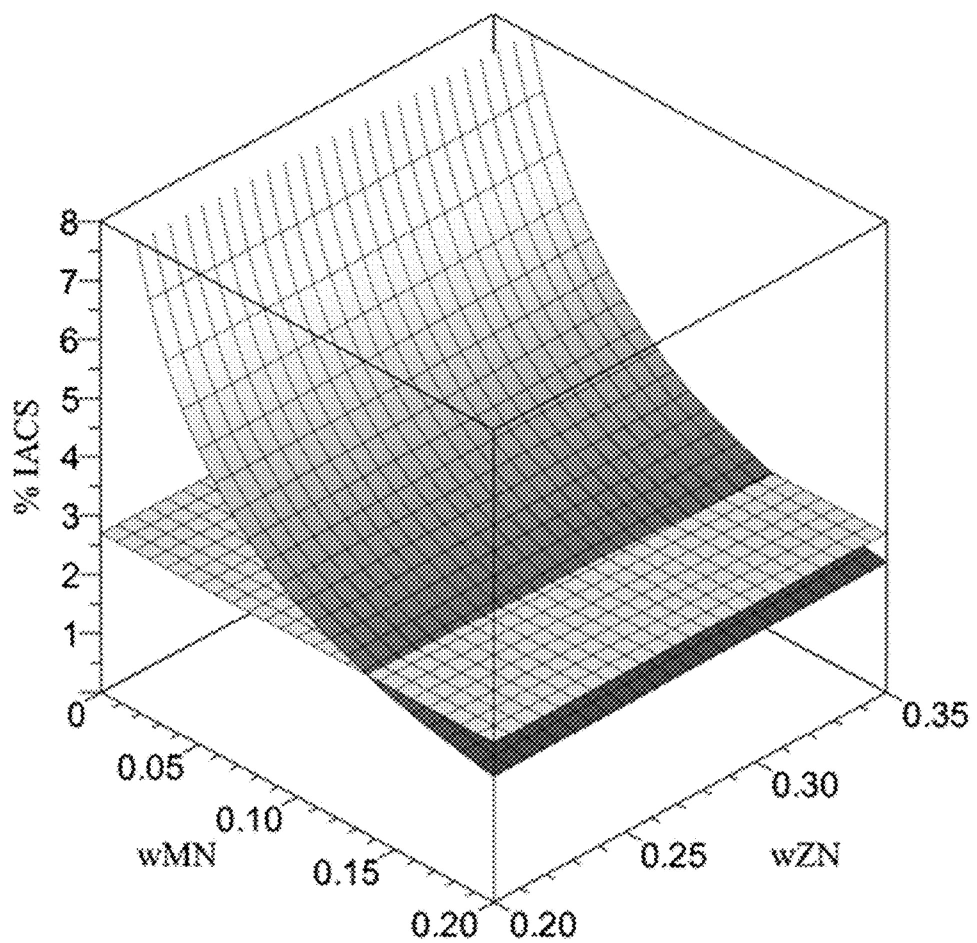
FIG. 5 shows a graph of electrical conductivity versus amount of nickel and manganese for various quaternary alloys of Cu—Mn—Ni—Zn.

In an embodiment, a process for forming the coinage cladding alloy includes determining (e.g., making a predictive model) a composition of the coinage cladding alloy based on electrical conductivity $\sigma$ of the coinage cladding alloy, wherein data used in the model can be empirical or theoretical data. In an embodiment, the coinage cladding alloy includes Cu—Mn—Ni—Zn, and FIG. 5 shows a graph of electrical conductivity versus an amount of Zn and an amount of Mn (by weight percentage (wt. %)), wherein an amount of Ni was 6 wt. %, and a balance of Cu, based on a total weight of the coinage cladding alloy. The coinage cladding alloy has a composition that is nominally a quaternary Cu—Mn—Ni—Zn composition with an electrical conductivity that is half that of a commercially available alloy having unified numbering system UNS C71300 (ASTM International manages the UNS jointly with SAE International), referred to herein as C71300 alloy with electrical conductivity of 5.5% IACS. According to the model, an amount of Mn affects the electrical conductivity $\sigma$ of the coinage cladding alloy more than an amount of Zn. In FIG. 5, the plane is a 2.7% IACS (International Annealed Copper Standard (IACS) measured in accordance with ASTM E1004-09 (2009)) electrical conductivity target for US coinage applications. The slope of the curve along the Zn-content axis shows effect of Zn amount on electrical conductivity compared to the amount of Mn and provides a range of compositional amounts of Zn and Mn in some embodiments of the coinage cladding alloy, depending on an amount of Cu and Ni present in the coinage cladding alloy.

The process also includes determining (e.g., from the model) an electrical conductivity dependence on an amount of Ni, Zn, Cu, Mn, and the like, or a combination thereof.

Figure 6:
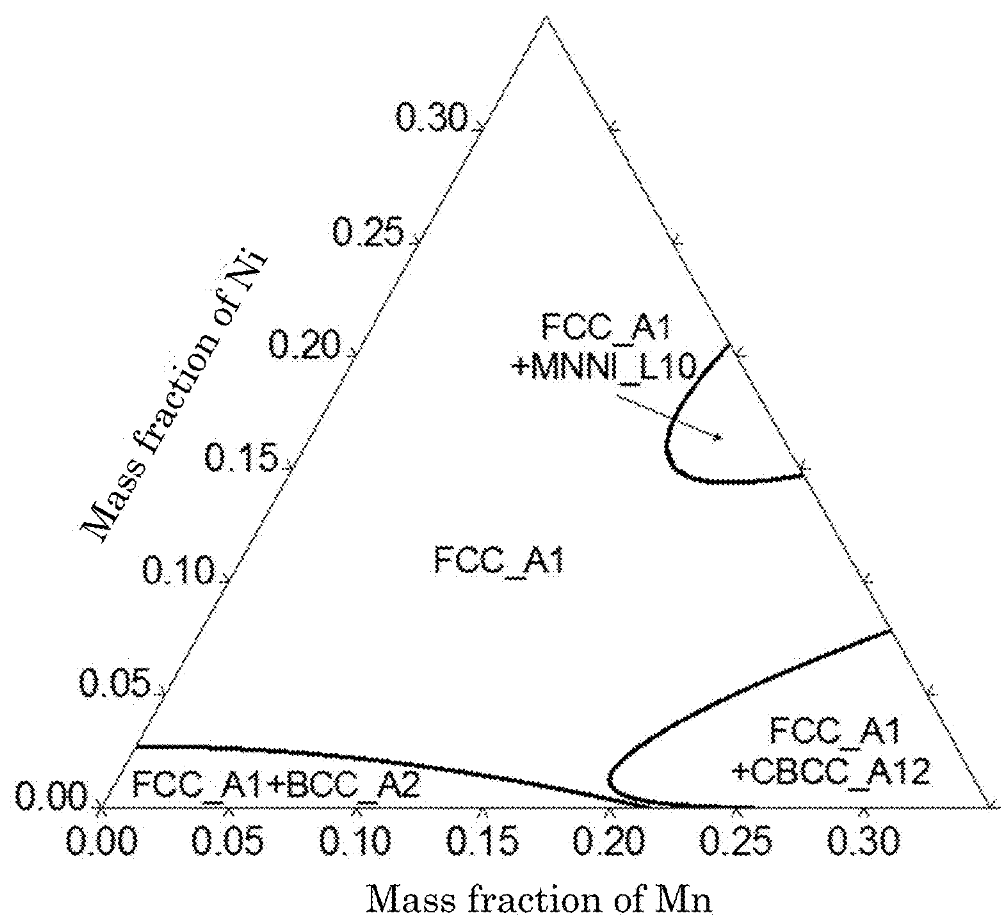
FIG. 6 shows an isothermal section of a quaternary Cu—Mn—Ni—Zn phase diagram for a constant mass of 55 wt. % Cu at 500° C.
Figure 7:
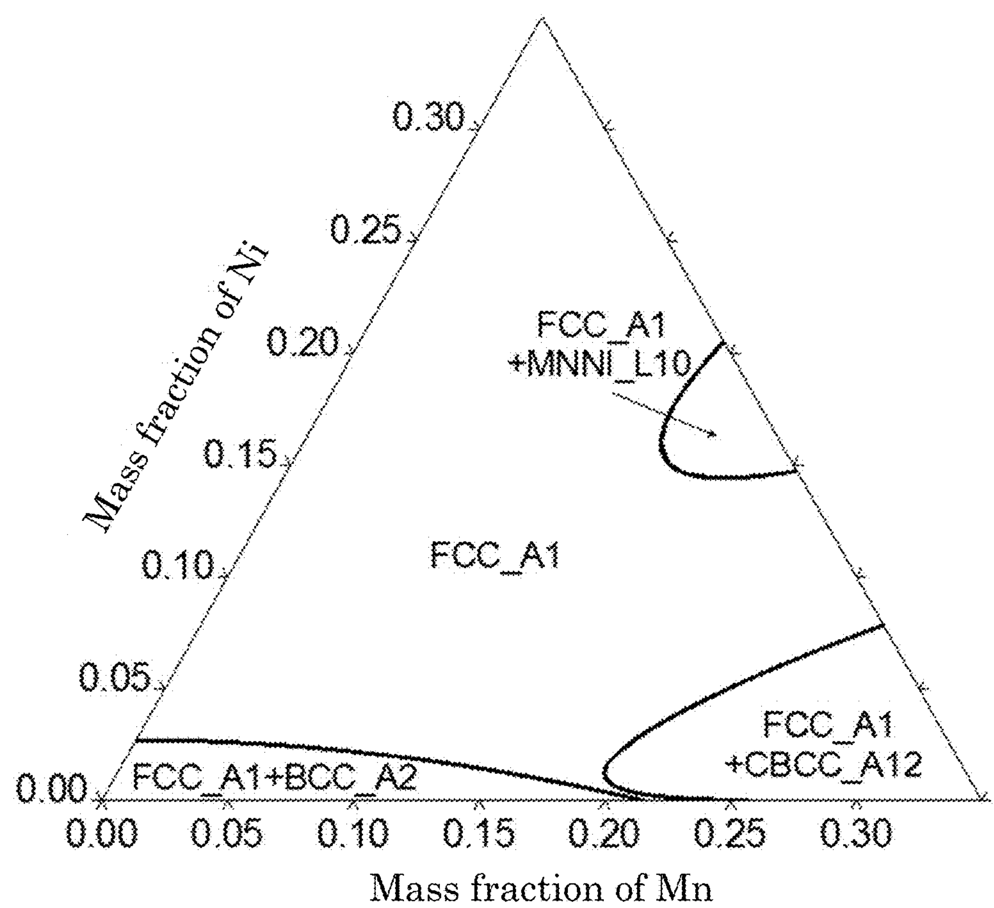
FIG. 7 shows an isothermal section of a quaternary Cu—Mn—Ni—Zn phase diagram for a constant mass of 55 wt. % Cu at 600° C.

The process can include constructing a model for selection of an elemental composition the metal elements (i.e., Cu, Ni, Zn, and Mn) in the alloying composition, annealing alloy, or coinage cladding alloy. Here, a thermodynamic database was constructed for the Cu—Mn—Ni—Zn quaternary alloy system from thermodynamic data and other physical and chemical properties available in published literature (e.g., Miettinen, "Thermodynamic description of the Cu—Ni—Zn system above 600° C.," *Calphad* 27, 263 (2003); Miettinen, "Thermodynamic description of the Cu—Mn—Ni system at the Cu—Ni side," *Calphad* 27, 147 (2003); and Miettinen, "Thermodynamic description of the Cu—Mn—Zn system in the copper-rich corner," *Calphad* 28, 313 (2004), the content of each of which is incorporated herein by reference). The database provided determination of equilibrium phase diagrams by calculation and also provided determination of a compositional ranges for phases that can form in an alloy of Cu, Mn, Zn, and Ni. FIG. 6 shows an isothermal section of a quaternary Cu—Mn—Ni—Zn phase diagram for a constant amount of 55 wt. % Cu at 500° C., wherein for an amount of Mn less than or equal to about 15 wt. %, a BCC phase is stable for Ni present in an amount that is less than about 3 wt. %. Similarly, FIG. 7 shows an isothermal section of a quaternary Cu—Mn—Ni—Zn phase diagram for a constant amount of 55 wt. % Cu at 600° C., wherein for an amount of Mn less than or equal to about 15 wt. %, a BCC phase is stable for Ni present in an amount that is less than about 3 wt. %. Moreover, in FIG. 6 and FIG. 7, a boundary appears between single-phase FCC and two phase FCC+BCC/B2 ($\beta$-brass at about 3 wt. % Ni. Scanning electron microscopy and electron diffraction spectroscopy (SEM/EDS) compositional analysis of the phases in coinage cladding alloy C99E-1 (see Table 2) suggested this boundary was closer to 5 wt. % Ni in C99E with less than 30 wt. % Zn for a about 55 wt. % Cu (alternatively ratio of Cu/Zn greater than about two) so that a safety margin of 1 wt. % Ni provides the coinage cladding alloy with an amount of Ni of about 6 wt. % Ni to minimize a financial cost of the coinage cladding alloy while providing only the FCC microstructure in the coinage cladding alloy.

In an embodiment, the coinage alloy is used in a coin for currency, and a single phase FCC microstructure is desired for coinage applications such that a minimum amount of Ni is used in the coinage alloy, e.g., a lower limit that can be 5 wt. % Ni, 6 wt. % Ni, or the like.

The process can include including electrical conductivity in the model and included an amount of Mn present for making the coinage cladding alloy. A plurality of coinage cladding alloys was made and characterized to provide experimental data to calibrate the model. Table 2 lists exemplary alloys produced. Here, the coinage cladding alloys listed in Table 2 were produced by vacuum induction casting, then either cold-rolled (CR) or warm-rolled into sheets with a thickness of approximately 1.6 mm, and finally annealed (typically at 750° C. for 30 min) and water-quenched (A-WQ). Warm-rolling is a rolling process in which the coinage cladding alloy is preheated in an oven, then rolled with cold rolls, and then reheated again prior to additional deformation. Hot-rolling involves having the coinage cladding alloy and rolls at an elevated temperature. With regard to data shown in Table 2, electrical conductivity and Vickers microhardness were measured after each process.

of weight composition of the coinage cladding alloy on calculated absolute conductivity for a constant mass fraction of (panel A) 13 wt. % Mn, (panel B) 15 wt. % Mn, (panel Cc) 21 wt. % Zn, and (panel D) 29 wt. % Zn in quaternary Cu—Mn—Ni—Zn. As shown in panels A and B of FIG. 8, the amount Ni present has a more dramatic effect on electrical conductivity as compared with the amount of Zn, wherein Zn changes the electrical conductivity by about 0.1% IACS over from 15 wt. % to 35 wt. % Zn for any given Ni concentration. For a given Zn-amount, the electrical conductivity varies by about 0.5% IACS over from 1 wt. % to 15 wt. % Ni. Mn has an even more pronounced effect on conductivity than Ni as shown in panels C and D of FIG. 8, wherein the electrical conductivity varies by 1.4% IACS from 10 wt. % to 20 wt. % Mn.

According to an embodiment, the model is used to provide the elemental composition in wt. % of each element (i.e., Cu, Mn, Zn, and Ni) for the coinage cladding alloy so that the coinage cladding alloy includes a selected electrical conductivity and also provides a complete set of composi-

TABLE 2

| Designation | Composition (wt. %) | | | | Conductivity | Hardness VHN100 | Color |
|---|---|---|---|---|---|---|---|
| (processing) | Nominal | Ni | Zn | Mn | (IACS @ 480 kHz) | (kg/mm$^2$) | b* |
| C99A-1 (CR) | Cu—5Ni—30Zn—10Mn | 5.45 ± 0.08 | 27.56 ± 0.18 | 9.28 ± 0.14 | 3.326 ± 0.010** | 243.4 ± 5.7 | — |
| C99A-1 (A-WQ) | | | | | 3.550 ± 0.043** | 94.5 ± 3.1 | 7.52 ± 0.12 |
| C99B-1 (CR) | Cu—5Ni—25Zn—15Mn | 5.64 ± 0.07 | 20.98 ± 0.13 | 14.32 ± 0.08 | 2.550 ± 0.006** | 250.0 ± 6.8 | — |
| C99B-1 (A-WQ) | | | | | 2.690 ± 0.014** | 101.1 ± 3.5 | 5.48 ± 0.24 |
| C99C-1 (CR) | Cu—5Ni—20Zn—20Mn | 5.47 ± 0.11 | 17.51 ± 0.17 | 18.80 ± 0.16 | 2.102 ± 0.001** | 250.1 ± 8.6 | — |
| C99C-1 (A-WQ) | | | | | 2.180 ± 0.011** | 108.5 ± 4.3 | 4.49 ± 0.24 |
| C99D-1 (CR) | Cu—5Ni—15Zn—25Mn | 5.58 ± 0.08 | 12.28 ± 0.15 | 23.63 ± 0.08 | 1.803 ± 0.003** | 253.8 ± 8.8 | — |
| C99D-1 (A-WQ) | | | | | 1.878 ± 0.008** | 121.4 ± 2.8 | 3.43 ± 0.42 |
| C99E-1 (CR) | Cu—5Ni—35Zn—5Mn | 4.78 ± 0.10 | 38.32 ± 0.11 | 4.64 ± 0.14 | 5.486 ± 0.009** | 248.6 ± 6.7 | — |
| C99E-1 (A-WQ) | | | | | 6.189 ± 0.042** | 135.4 ± 8.2 | 9.76 ± 0.53 |
| C99F-1 (WR) | Cu—40Zn—7Mn | — | 44.76 ± 0.13 | 6.25 ± 0.21 | 6.591 ± 0.039** | 239.6 ± 11.3 | — |
| C99F-1 (A-WQ) | | | | | 6.946 ± 0.165** | 166.9 ± 5.2 | 10.96 ± 0.23 |
| C99E-2 (WR) | Cu—5Ni—35Zn—5Mn | 4.82 ± 0.10 | 25.60 ± 0.12 | 13.44 ± 0.18 | 4.934 ± 0.003** | 227.9 ± 4.8 | — |
| C99E-2 (A-WQ) | | | | | 5.280 ± 0.010** | 86.6 ± 4.7 | 6.65 ± 0.37 |

**Electrical Conductivity measured at 240 kHz instead of 480 kHz;
CR: cold-rolled;
WR: warm-rolled; and
A-WQ: annealed and water quenched.

Alloys designated C99A through C99F were alloys used to calibrate the quaternary electrical conductivity model. C99E-1 contained a significant volume fraction of the β-brass phase, while C99F-1 was fully β-brass. The β-brass is caused a sharp increase in electrical conductivity in both C99E-1 and C99F-1 compared to C99A-1 through C99D-1, as well as contributed to the increase in microhardness in the A-WQ state. It also affected the alloy color, turning the material from silvery white to a yellowish brassy hue.

Again, FIG. 5 shows an exemplary composition-dependent electrical conductivity for the Cu—Mn—Ni—Zn system that was calculated at a constant 55 wt. % Cu, based on a total weight of alloy. Here, Mn effectively reduced electrical conductivity more than Ni. In an embodiment, about 0.5 wt. % Mn is included in the coinage cladding alloy per 1 wt. % Ni removed from the elemental composition in the coinage cladding alloy to maintain constant electrical conductivity of the coinage cladding alloy.

Figure 8:
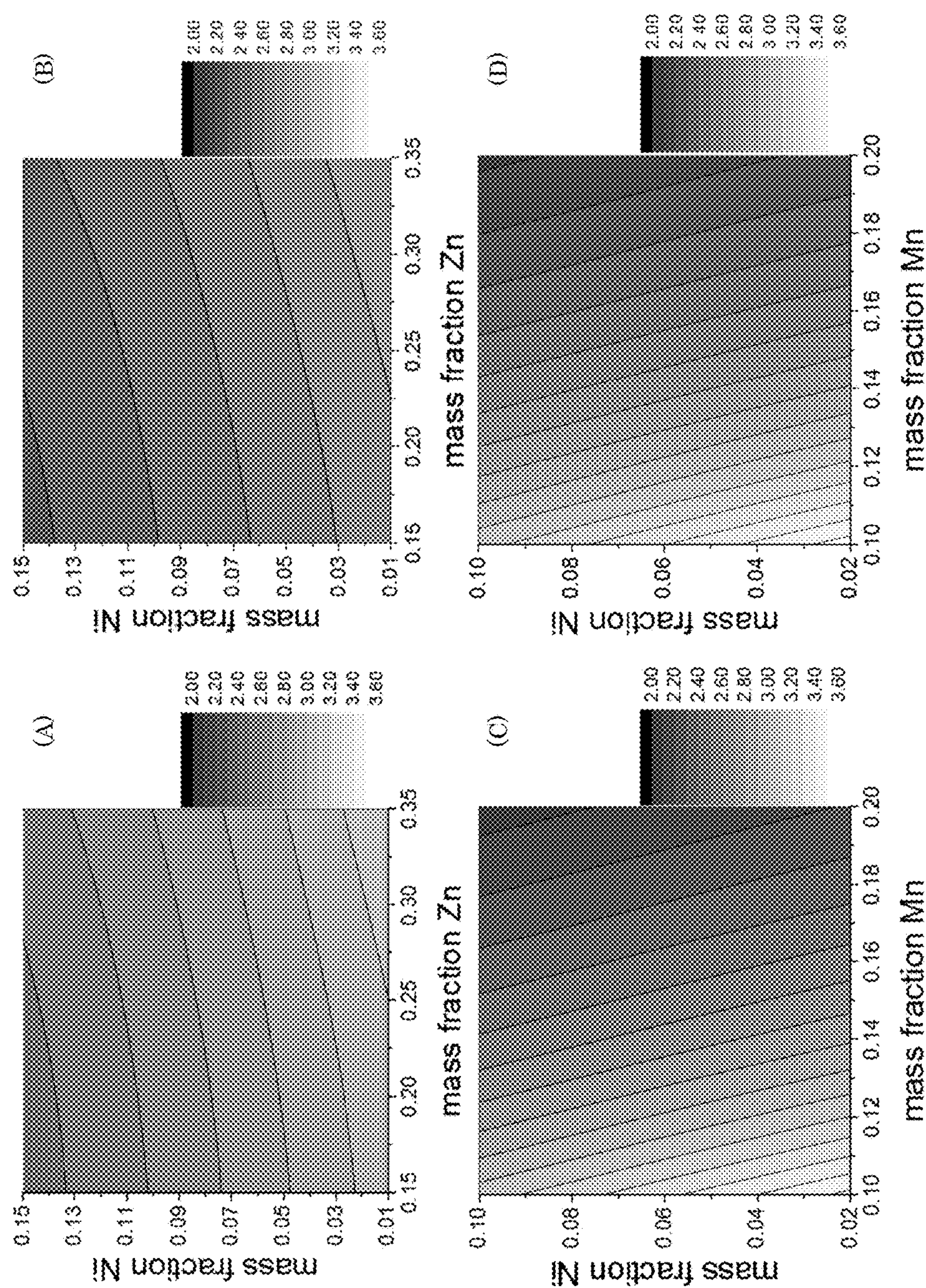
FIG. 8 shows graphs of mass fraction Ni versus mass fraction Mn for a dependence of weight composition of the coinage cladding alloy on calculated absolute conductivity for a constant mass fraction of (panel A) 13 wt. % Mn, (panel B) 15 wt. % Mn, (panel Cc) 21 wt. % Zn, and (panel D) 29 wt. % Zn in quaternary Cu—Mn—Ni—Zn.

In an embodiment, electrical conductivity data for alloys C99A-1 through C99D-1 were collected for alloys formed under the A-WQ condition, and the quaternary electrical conductivity model was constructed. FIG. 8 shows graphs of mass fraction Ni versus mass fraction Mn for a dependence tional tolerances. In an embodiment, the coinage cladding alloy includes less than or equal to 7 wt. % Ni, less than 30 wt. % Zn, electrical conductivity from 2.0% IACS to 3.0% IACS, and a Vickers microhardness from 80 VHN to 120 VHN. According to an embodiment, with reference to Table 2, microhardness has an upper limit at about 19 wt. % Mn, and electrical conductivity up to 3.0% IACS near 12 wt. % Mn (with 6 wt. % Ni and 25 wt. % Zn)

In an embodiment, the coinage cladding alloy is C99B (e.g., C99B-1 in Table 2). Moreover, C99B coinage cladding alloy can be modified to a Mn-content of 14 wt. % to reduce the hardness, replacing some of the Mn with Ni to obtain the selected 6 wt. % Ni to provide a fully FCC structure of the coinage cladding alloy. Here, Zn is present at 25 wt. % Zn to provide coinage cladding alloy C99H with a composition of Cu-6Ni-25Zn-14Mn.

In an embodiment, C99H-1 (see Table 2) coinage cladding alloy was produced and had an electrical conductivity of 2.514±0.009% IACS and a microhardness of 102.6±4.1 VHN.

Figure 9:
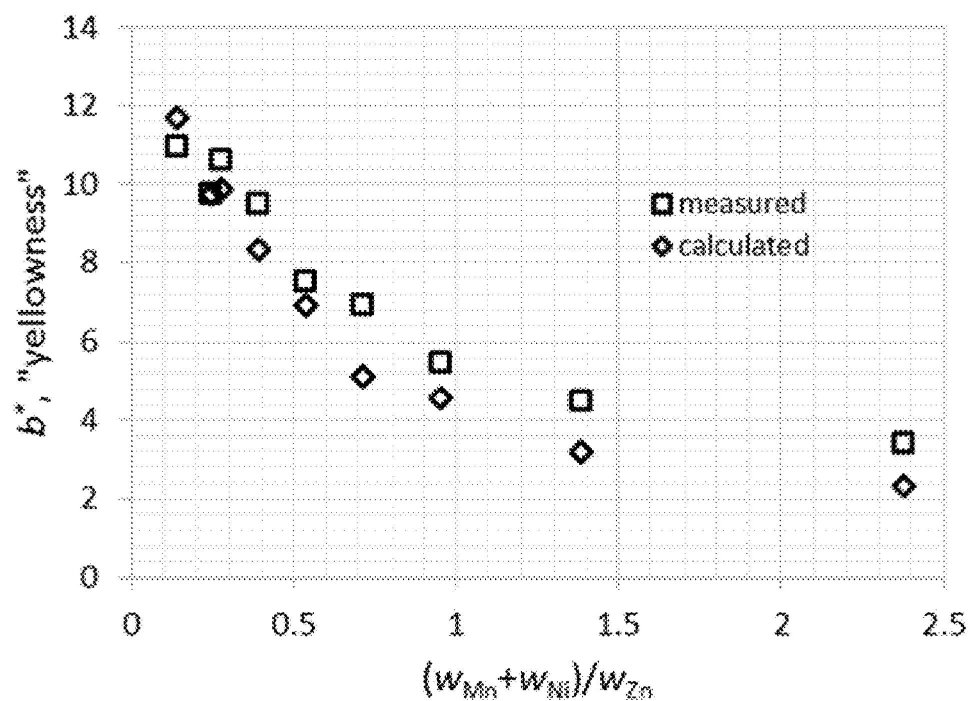
FIG. 9 shows a graph of yellow color vector b* versus total amount of Mn and Ni normalized to an amount Zn for an iteration of an empirical color model for a coinage cladding alloy, wherein calculated and measured values of b* are plotted.

Without wishing to be bound by theory, it is believed that about half of the wt. % of Mn produces a given electrical conductivity as compared with the wt. % of Ni in the coinage cladding alloy. Moreover, as the amount of Ni is reduced, the coinage cladding alloy obtains a more yellow color based on the b* yellow color vector. The b* vector in the La*b* color space was used as a metric for a degree of yellowness of the coinage cladding alloy. A maximum b* value can be selected, e.g., to be 10, to be 7, or the like depending on the degree of yellow color desired for the coinage cladding alloy. To incorporate color, e.g., the degree of yellow color, into the process for selecting an elemental composition of the metals in the coinage cladding alloy, an empirical model for the color vector b* as a function of atomic composition of the metals in the coinage cladding alloy was constructed from the data for b* collected using the experimental alloys produced, e.g. those listed in Table 2. FIG. 9 shows a graph of b* versus total wt. % of Mn and Ni normalized to wt. % of Zn from calculated results of a first iteration of this model compared to experimentally measured values from the alloys listed in Table 2. Data from additional alloys not listed in Table 2 were used to refine the model.

The model also can include cost as a factor to determine an atomic composition of the coinage cladding alloy for a selected electrical conductivity of the coinage cladding alloy. Here, a summation of costs for each of the four metals, i.e., Cu, Mn, Ni, and Zn, in the coinage cladding alloy were weighted by the amount (i.e., wt. %) of each metal for a given atomic composition of the coinage cladding alloy, e.g., as provided in formula 1 as follows:

$$\text{cost}=\Sigma^{4}_{i=1}(c_i)(m_i) \quad (1),$$

wherein cost can have units of currency per mass (e.g., $/kg); i is an index of summation over each metal (i.e., Cu, Mn, Ni, and Zn); c is a cost per mass of the i-th metal, and m is a mass fraction of the i-th metal in the coinage cladding alloy. In an embodiment, costs are $7.8/kg for Cu, $2.3/kg for Mn, $14.5/kg, for Ni, and $2.1/kg for Zn.

In an embodiment, the model included determining an atomic composition for the coinage cladding alloy based on a desired color for the coinage cladding alloy. The color can be parameterized by using yellowness vector b*, which was incorporated into the model. According to an embodiment, the atomic composition of the coinage cladding alloy was determined for an electrical conductivity of 2.7% IACS and arbitrary value of color vector b*. The atomic composition output from the model was used to make various coinage cladding alloys that were subjected to characterization. The coinage cladding alloy included alloys listed in Table 2 as C99H. Table 3 lists certain C99H coinage cladding alloys and their properties.

TABLE 3

| Coinage cladding alloy | Conductivity (% IACS, @ 480 kHz) | Ni (wt. %) | Zn (wt. %) | Mn (wt. %) | Cu (wt. %) |
|---|---|---|---|---|---|
| C99H-2.6 | 2.6 | 5.5-6.5 | 23.0-27.0 | 13.5-15.5 | balance |
| C99H-2.7 | 2.7 | 5.5-6.5 | 23.0-27.0 | 13.0-15.0 | balance |
| C99H-2.8 | 2.8 | 5.5-6.5 | 23.0-27.0 | 12.0-14.0 | balance |

In an embodiment, the coinage cladding alloy is C99H, wherein the b* vector is 5.15 and includes 6.2 wt. % Ni. In a certain embodiment, C99H has a composition of Cu-6.2Ni-23.8Zn-14.4Mn. An electrical conductivity of C99H can be, e.g., 2.51 produced from an annealing alloy under the A-WQ processing of the annealing alloy. Here, the A-WQ processing includes annealing at a temperature of 750° C. for 30 min and quenching into room temperature water. For C99H, without wishing to be bound by theory, it is believed that electrical conductivity of C99H is not sensitive to the quenching rate of the annealing alloy during formation of the coinage cladding alloy. The electrical conductivity of C99H changes less than 0.05% IACS when the annealing alloy is subjected to cooling by water quenching (high cooling rate) and furnace cooling (slow cooling rate), wherein substantially no atomic ordering occurs, or atomic ordering occurs has little effect on electrical conductivity of C99H.

Figure 10:
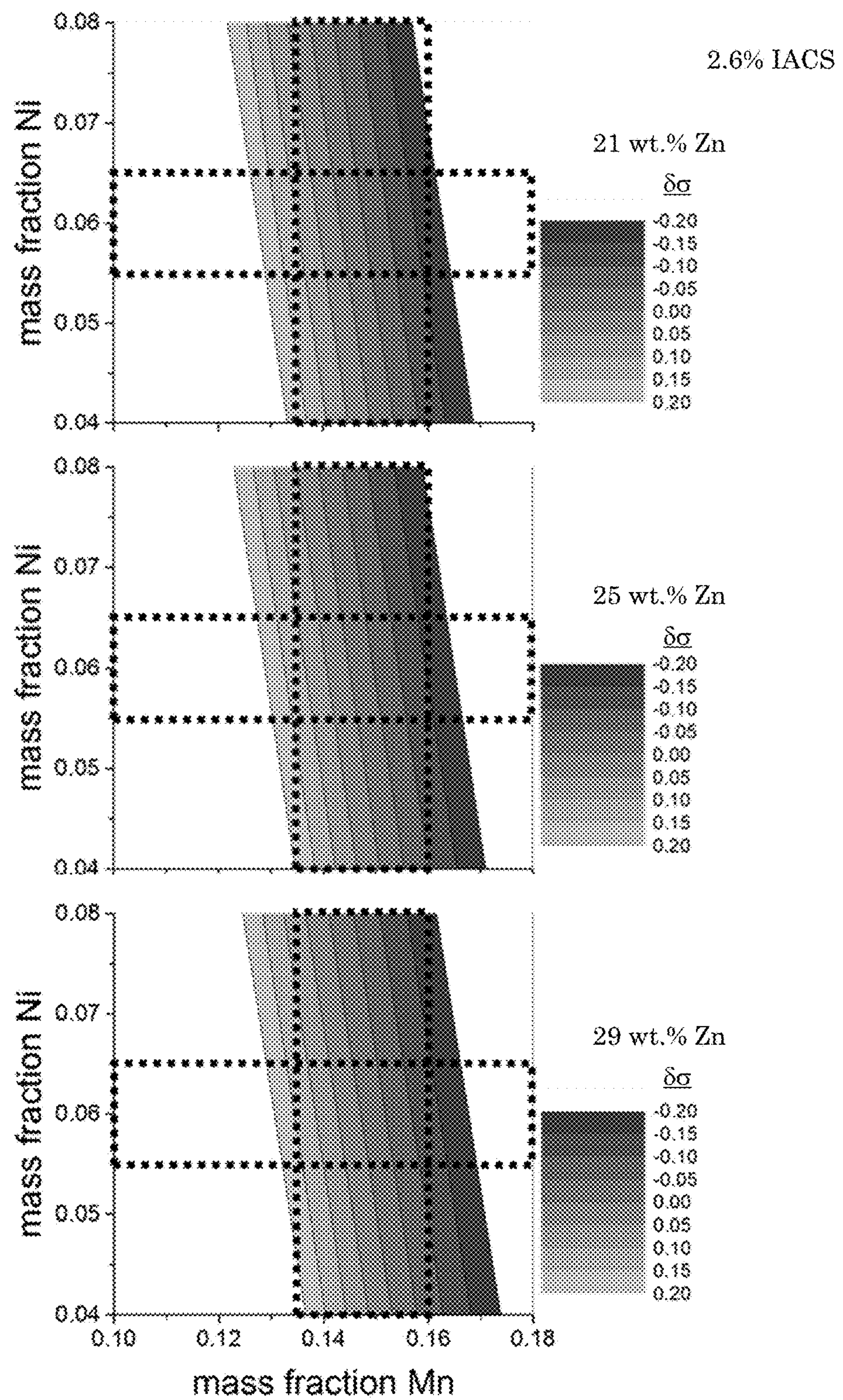
FIG. 10 shows graphs of mass fraction of Ni versus mass fraction of Mn with an overlay of calculated deviation in electrical conductivity from C99H coinage cladding alloy having 2.6% IACS in which panel A shows a constant 21 wt. % Zn; panel B shows a constant 25 wt. % Zn; and panel C shows a constant 29 wt. % Zn, wherein dashed boxes in panels A, B, and C bound the electrical conductivity of the C99H coinage cladding alloy to within ±0.2% IACS of the target value.
Figure 11:
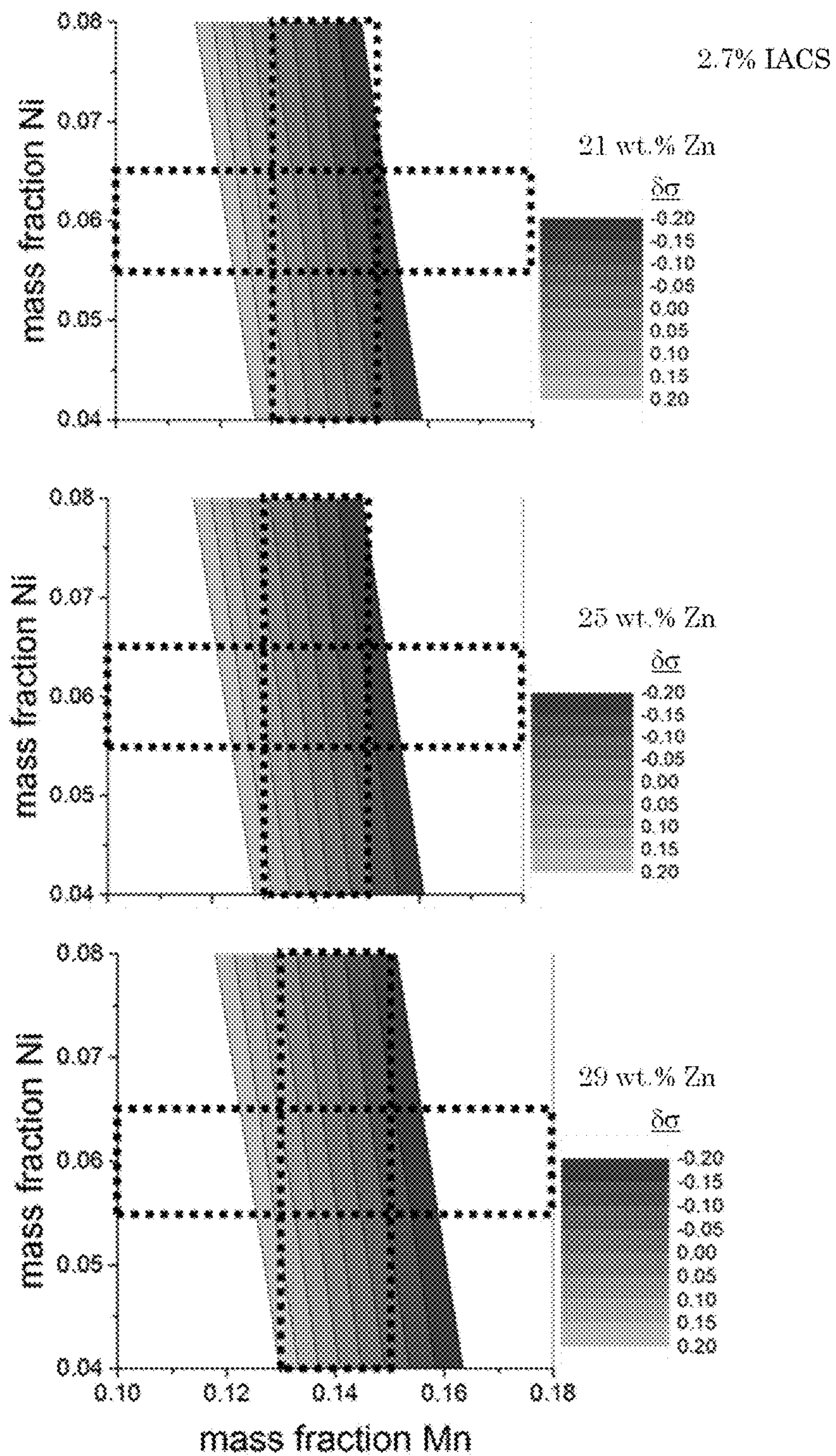
FIG. 11 shows graphs of mass fraction of Ni versus mass fraction of Mn with an overlay of calculated deviation in electrical conductivity from C99H coinage cladding alloy having 2.7% IACS in which panel A shows a constant 21 wt. % Zn; panel B shows a constant 25 wt. % Zn; and panel C shows a constant 29 wt. % Zn, wherein dashed boxes in panels A, B, and C bound the electrical conductivity of the C99H coinage cladding alloy to within ±0.2% IACS of the target value.
Figure 12:
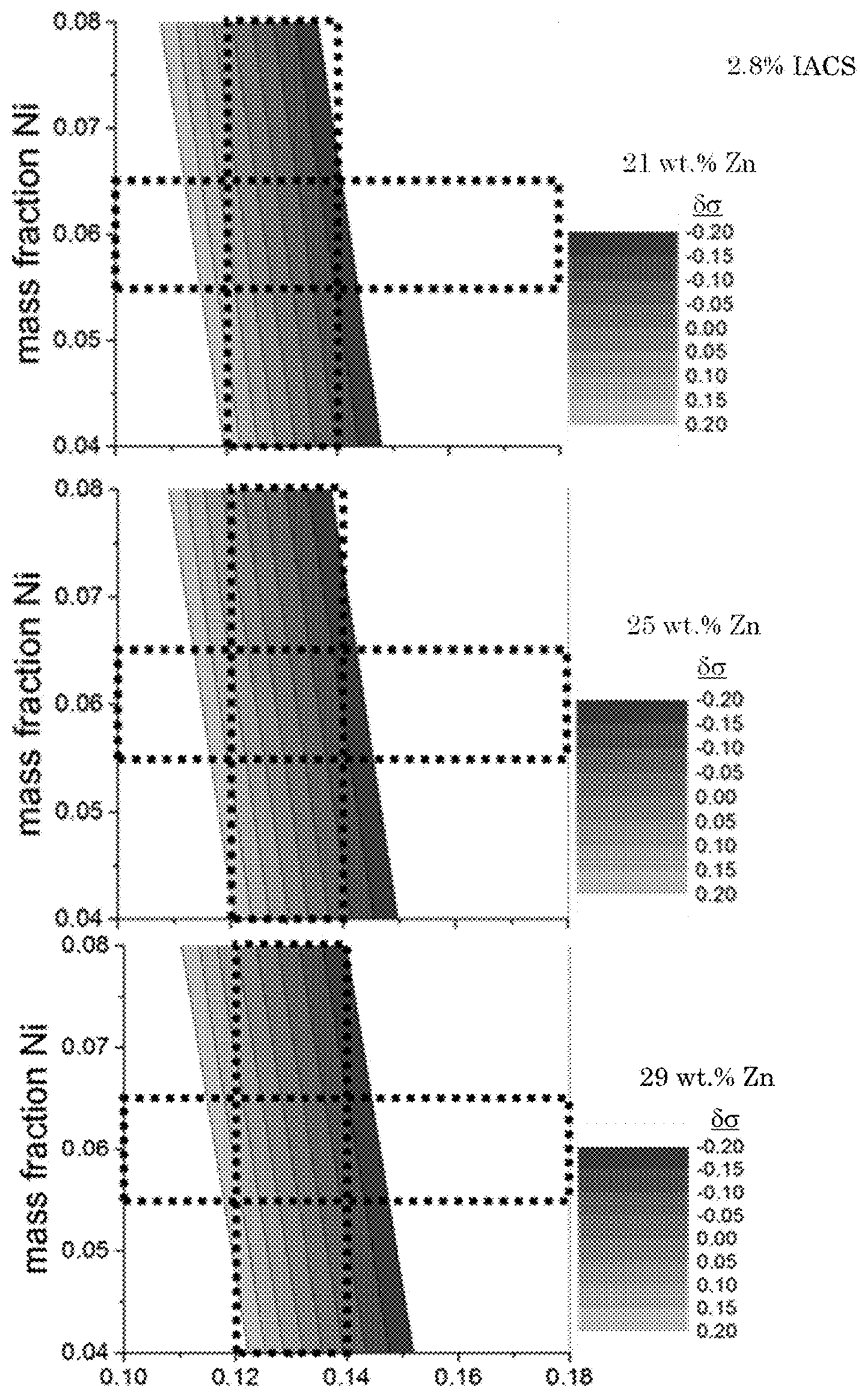
FIG. 12 shows graphs of mass fraction of Ni versus mass fraction of Mn with an overlay of calculated deviation in electrical conductivity from C99H coinage cladding alloy having 2.8% IACS in which panel A shows a constant 21 wt. % Zn; panel B shows a constant 25 wt. % Zn; and panel C shows a constant 29 wt. % Zn, wherein dashed boxes in panels A, B, and C bound the electrical conductivity of the C99H coinage cladding alloy to within ±0.2% IACS of the target value.

In an embodiment, once the atomic composition of C99H was selected, the electrical conductivity model was used to specify composition limits for each of the metals. FIG. 10, FIG. 11, and FIG. 12 show graphs of a deviation in electrical conductivity ($\delta\sigma$) from that calculated for the measured composition of C99H with three different electrical conductivities of 2.6% IACS, 2.7% IACS, and 2.8% IACS, respectively. FIG. 10, FIG. 11, and FIG. 12 include the deviation in electrical conductivity from target values of 2.6% IACS, 2.7% IACS, or 2.8% IACS as a function of mass fractions of Mn and Ni for three Zn amounts of 21 wt. %, 25 wt. %, and 29 wt. % per target conductivity. In FIG. 10, FIG. 11, and FIG. 12, the dashed boxes are identical in each plot for a given target conductivity, and bound the compositional range of Mn and Ni in which the electrical conductivity of the alloy is within ±0.2% IACS for each of the three Zn amounts. Here, the amount of Ni is the same for each target conductivity, and the Mn-limits decrease with increasing electrical conductivity. The Mn and Ni composition tolerances for an alloy with a specified target conductivity are given by the bounds of these boxes, while the Zn composition window was set between 23 wt. % and 27 wt. %.

In an embodiment, a process for making the coinage cladding alloy includes heating an alloying composition to a first temperature that is greater than or equal to an annealing temperature to form an annealing alloy, the alloying composition including: nickel present in an amount from 5 wt. % to 7 wt. %, based on a total weight of the alloying composition; zinc present in an amount from 21 wt. % to 29 wt. %, based on the total weight of the alloying composition; manganese present in an amount from 12 wt. % to 16 wt. %, based on a total weight of the alloying composition; and copper; and quenching, by cooling the annealing alloy from the first temperature to a second temperature that is less than the annealing temperature, under a condition effective to form the coinage cladding alloy comprising the electrical conductivity and the yellowness vector b*. In the process, heating the alloying composition includes melting the alloying composition to form a molten alloy; and cooling the molten alloy to the first temperature to form the annealing alloy. The annealing temperature can be from 700° C. to 800° C.; and the condition includes a cooling rate that is greater than or equal to air cooling from the first temperature to the second temperature. The process for making the also can include casting the molten alloy to form the annealing alloy in a solid state. In some embodiments, the copper is present in an amount as a balance of the total weight of the coinage cladding alloy, e.g., in an amount from 50 wt. % to 62 wt. %, based on the total weight of the coinage cladding alloy. The coinage cladding alloy can include a disordered crystalline phase, wherein atoms of the nickel, copper, zinc, and manganese are randomly arranged in the disordered crystalline phase at room temperature in a post-annealed state. Moreover, the disordered crystalline phase can include a single phase. Further, the single phase can be a face-centered cubic phase.

In the process, the electrical conductivity of the coinage cladding alloy can be produced from quenching the annealing alloy from the annealing temperature at a cooling rate effective to produce the coinage cladding alloy in a disordered crystalline phase. The cooling rate can be greater than or equal to air cooling from the annealing temperature to room temperature.

The coinage cladding alloy can have a yield strength from 100 MPa to 180 MPa, a hardness of the coinage cladding alloy is from 80 VHN to 250 VHN, or a combination thereof. The electrical conductivity of the coinage cladding alloy can be selected via the process such that a coin including the coinage cladding alloy is acceptable as currency in a vending machine that accepts the coin, e.g., in a coin that includes a first cladding layer and a second cladding layer made of the coinage cladding alloy with a core layer (e.g., including copper) interposed between the first cladding layer and the second cladding layer.

In an embodiment, a coin blank includes the coinage cladding alloy, wherein an electrical conductivity of the coin blank is substantially equivalent to the electrical conductivity of UNS C71300 alloy. According to an embodiment, a process for making the coin blank includes punching coin blanks from a material sheet; annealing the blanks at a selected annealing temperature or a selected annealing time, quenching the blanks at the annealing temperature for a selected time in a fluid bath (e.g., a water bath); subjecting the blanks to remove oxide scale formed during annealing (e.g., by pickling the blanks); disposing an anti-tarnish coating on the blanks; upsetting the blank by deforming the blank edges to form a coin rim; and striking a plurality of the coins. The coins can be packaged (e.g., bagged) and shipped for distribution. In some embodiments, a plurality of coins is made from the coin blanks, and the coins have an electrical conductivity that is substantially identical to that of the coinage cladding alloy. In an embodiment, the coins have an acceptance rate of 100% with coin vending machines, coin counters, coin detectors, and the like.

The coinage cladding alloy has beneficial, advantageous, and unexpected properties. A color of the coinage cladding alloy is silvery-white, wherein the color has: an a* value that from −10 to 10 and specifically less than 2.5; and a b* value that from −10 to 10 and specifically less than 10.0, measured in accordance on the Commission of Illumination L*a*b*color space determined in accordance with ASTM Standard E308-15 (2015). The electrical conductivity of the coinage cladding alloy is from 2% IACS to 3% IACS, as determined by an eddy current conductivity meter operating at a frequency from 60 to 480 kHz in accordance with ASTM E1004-09 (2009). In an embodiment, the electrical conductivity of the coinage cladding alloy is from 2.5% IACS to 2.9% IACS. In a certain embodiment, the electrical conductivity of the coinage cladding alloy is within ±0.2% IACS of an electrical conductivity 2.7% IACS. According to an embodiment, the electrical conductivity of the coinage cladding alloy is effective such that the coin includes the coinage cladding alloy is accepted by coin-operated vending machines in the United States.

The coinage cladding alloy has a mechanical property such that the coinage cladding alloy can be subjected to mechanical modification such as stamping, wherein a sheet of the coinage cladding alloy is formed into an article such as a coin. The coinage cladding alloy can have a yield strength from 100 megapascals (MPA) to 180 MPa. Beneficially, the coinage cladding alloy excellent resistance to discoloration and corrosion-wear resistance equal to or better than alloy C71300 (alloy currently used in US coins).

The coinage cladding alloy has an initial work hardening coefficient from 0.05 to 0.15, calculated from a tensile stress-strain curve over a strain range from 0.01 to 0.1, using Hollomon's equation for the power law relationship between stress and plastic strain. A corrosion rate of the coinage cladding alloy is effective so that the coinage cladding alloy is applicable in in a currency application, e.g., in a currency coin used in commerce. The coinage cladding alloy has excellent wear resistance such that the coinage cladding alloy has a long lifetime of years, e.g., decades. A density of the coinage cladding alloy is similar to cupronickel such that a coin that includes the coinage cladding alloy has a same mass as a coin that includes cupronickel. In an embodiment, a coin includes: a first cladding layer including the coinage cladding alloy; a second cladding layer including the coinage cladding alloy opposingly disposed from the first cladding layer; and a core layer interposed between the first cladding layer and the second cladding layer. The electrical conductivity is selected such that the coin including the coinage cladding alloy is acceptable as currency in a vending machine that accepts the coin. The core layer includes copper in some embodiments.

In an embodiment, the coinage cladding alloy beneficially has an electrical conductivity such that the coinage cladding alloy is a replacement for the USN C71300 alloy used in U.S. coinage applications. In an embodiment, the C9911 coinage cladding alloy has an atomic composition (i.e., relative mass fractions of Cu, Zn, Mn, and Ni) that is outside a composition range where atomic ordering should occur at high or low quenching rates.

In an embodiment, the coinage cladding alloy includes a single phase. In a certain embodiment, the single phase includes face-centered cubic (FCC) arrangement of atoms. Without wishing to be bound by theory, it is believed that when cooling the annealing alloy from the first temperature to the second temperature to form the coinage cladding alloy, the annealing alloy has an FCC structure, and an ordering reaction does not occur upon cooling to the second temperature such that the FCC structure is the only phase present in the coinage cladding alloy. In some embodiments, even though an ordered phase (referred to as $L1_2$ and $L1_0$ with respect to phases) in ternary Cu—Ni—Zn systems are known to exist, embodiments of the coinage cladding alloy do not include the ordered $L1_2$ or $L1_0$ phase, wherein the coinage cladding alloy has the FCC phase substantially so that the coinage cladding alloy can replace the UNS 13700 alloy in US coins such as the ten-cent coin, twenty-five-cent coin, and fifty-cent coin (i.e., 10¢, 25¢, and 50¢, respectively $0.10, $0.25, and $0.50 US dollar (USD)).

In an embodiment, the rate at which the annealing alloy is cooled from the first temperature is selectively controlled to produce the coinage cladding alloy having the single phase disordered crystalline phase and selected electrical conductivity and hardness. Without wishing to be bound by theory, it is believed that the ordering reaction from FCC to L1 occurs rapidly at a certain cooling rate, and the degree of atomic ordering varies from completely atomically disordered to fully atomically ordered such that the atomic ordering depends on the quenching rate from annealing temperature TA to approximately room temperature. Accordingly, in an embodiment, the cooling rate is selected to be high enough to form selectively the coinage cladding alloy from the annealing alloy, wherein the coinage cladding alloy includes the disordered crystalline phase in an absence of the L1 phase.

The hardness of the coinage cladding alloy is effective such that the coinage cladding alloy can be subjected to mechanical deformation to produce an article such as a coin. The hardness can be a Vickers micro hardness from 80

HV02 (HV02 indicates the Vickers hardness number measured with a force of 0.2 kg) to 120 HV02, specifically less than 108 HV02. Mechanical deformation can include bending, stretching, cutting, and the like. In an embodiment, a sheet of the coinage cladding alloy is formed and subjected to stamping to form an article such a plurality of coins.

The coinage cladding alloy advantageously provides for seamless substitution of current cupronickel alloys used in certain currency, e.g., coins such as U.S. coins. In a particular embodiment, the coinage cladding alloy is a replacement for cupronickel alloy (e.g., USN C71300 alloy) used in production by the United States Mint of ten-cent, twenty-five-cent, and fifty-cent U.S. coins (i.e., "dimes," "quarters," and "half-dollars"). Here, a number of benefits in substituting C99H for C71300 in cladding type US coinage currency. This alloy is less costly compared to both C71300 and pure Cu metal, reducing the materials' cost per coin in two ways: first by substituting it for C71300 as the cladding material; and second the decreased conductivity allows the cladding layer thickness to be increased, decreasing the total amount of Cu metal needed to produce each coin. The decreased electrical conductivity and increased cladding layer thickness also widen the required tolerances in final coin thickness and conductivity (of each layer and overall), improving the acceptance rate of final coin products in terms of their composite electrical behavior. In addition to an electrical conductivity of about 2.7%, the coinage cladding alloy can have yield strength from about 110±20 MPa and a strain to failure of greater than 50% and work hardening exponents of about 0.1 for $\varepsilon$ that is 0.01 to 0.1 and 0.2 for $\varepsilon$=0.1 to 0.15.

In an embodiment, the coinage cladding alloy is a white copper alloy that includes 12-16 wt. % Mn, 5-7 wt. % Ni, 21-29 wt. % Zn, impurity or tramp elements in present in an amount from 0 wt. % to 0.2 wt. %, and a balance of Cu, with physical and chemical properties for use in currency applications. Here, the coinage cladding alloy possesses the properties: is silvery-white in appearance; has an electrical conductivity of 2.6-2.8% IACS measured with an eddy current conductivity meter operating at frequencies of 60-480 kHz; has mechanical properties conducive for stamping operations, a yield strength of 100-180 MPa, and an initial work hardening coefficient of about 0.1; has acceptable corrosion behavior for currency applications (e.g., in a coin); has excellent wear resistance; and has a density similar to cupronickel (e.g., C71300 alloy) such that a coin made of the coinage cladding alloy has a same mass as a coin made of cupronickel.

It has been found that the coinage cladding alloy can be used in currency applications due to its physical, chemical, or mechanical property. The coinage cladding alloy can be cast or prepared into a selected format by, e.g., a process that includes thermo-mechanically processing (e.g., rolling, forging, and the like).

The coinage cladding alloy is a seamless substitution for cupronickel in U.S. coin-making at a cost that is, e.g., 35% less than current cupronickel alloy. The electrical conductivity of the coinage cladding alloy is such that the coinage cladding alloy is used as a coin with coin-operated vending machines, coin counters, coin identification machines, and the like.

Advantageously and unexpectedly, the conductivity of the coinage cladding alloy is selected such that a coin including the coinage cladding alloy is acceptable as currency in a vending machine that accepts the coin. Acceptance of the coin contemplates that an electrical signature (e.g., electrical conductivity) of the coin is equivalent to an electrical signature of currently available coins made with their current material when measured using current coin-sorting technology.

In an embodiment, the coinage cladding alloy is used in a variety of applications that use a conductive metal having the electrical conductivity of the coinage cladding alloy, e.g., as an electrical contact for an electronic device. An electrical contact formed using the coinage cladding alloy can be used such that a first component and a second component are arranged in a spaced apart relation. The coinage cladding alloy (or a composition comprising the coinage cladding alloy) is disposed between and in physical contact with the first component and the second component to form an electrical path between the first component and the second component. The coinage cladding alloy can be in a wide variety of forms to contact the first and the second component. The form may be, for example, a wire, cable, button, coating, and the like.

In an embodiment, the coinage cladding alloy is a portion of a conductive contact in a connector, switch, or insert. Examples of the connector are a blade connector, push-on connector, crimp connector, multi-pin connector (e.g., a D-sub connector), bolt connector, set screw connector, lug, wedge connector, bolted connector, compression connector, coaxial connector, wall connector, surface mount technology (SMT) board connector, IPC connector, DIN connector, phone connector, plastic leaded chip carrier (PLCC) socket or surface mount connector, integrated circuit (IC) connector, ball grid array (BGA) connector, staggered pin grid array (SPA) connector, busbar connector, or the like. Switches include, e.g., a circuit breaker, mercury switch, wafer switch, dual-inline package (DIP) switch, reed switch, wall switch, toggle switch, in-line switch, toggle switch, rocker switch, microswitch, rotary switch, and the like. An insert can be, e.g., a transition washer, disc, tab, and the like.

The coinage cladding alloy has a number of advantages. The coinage cladding alloy has sufficient electrical conductivity to prevent development of an unacceptably high contact resistance. Use of the coinage cladding alloy decreases use of precious metal plating of electrical contacts while conserving operational characteristics of such current-carrying contacts. In addition, the coinage cladding alloy is manufactured from widely available materials.

The articles and processes herein are illustrated further by the following Example, which are non-limiting.

EXAMPLE

Making Cu-6Ni-25Zn-14Mn coinage cladding alloy.

A Cu-6.2Ni-23.8Zn-14.4Mn coinage cladding alloy was made by melting together the appropriate amounts of the pure elements Cu, Ni, Zn, and Mn required to produce a 1 kg ingot of the coinage alloy composition and pour casting into a copper mold; hot rolling the ingot into a sheet 0.065 inches in thickness; annealing in air at 750° C. for 30 min; quenching into room temperature water.

The Cu-6Ni-25Zn-14Mn coinage cladding alloy exhibited the properties: electrical conductivity of 2.51% IACS; color vector of L=80.35, a*=0.15, and b*=5.15; Vickers microhardness of 103 VHN; tensile yield strength of 114 MPa; ultimate tensile strength of 347 MPa; strain to failure of 0.53; initial work hardening coefficient of 0.09.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A post-annealed coinage cladding copper alloy for coinage comprising:

nickel present in an amount from 5 wt. % to 7 wt. %, based on a total weight of the coinage cladding alloy;

zinc present in an amount from 21 wt. % to 29 wt. %, based on the total weight of the coinage cladding alloy;

manganese present in an amount from 12 wt. % to 16 wt. %, based on a total weight of the coinage cladding alloy;

copper;

an electrical conductivity from 2% International Annealed Copper Standard (IACS) to 3% IACS measured in accordance with ASTM E1004-09 (2009);

a disordered crystalline phase, wherein atoms of the nickel, copper, zinc, and manganese are randomly arranged in the disordered crystalline phase at room temperature in a post-annealed state;

a hardness of the coinage cladding alloy from 80 VHN to 120 VHN; and a color comprising a yellowness vector b* that is from 2 to 10, based on a CIE L*a*b* color space and determined in accordance with ASTM Standard E308-15 (2015).

2. The coinage cladding alloy of claim 1, wherein the copper is present in an amount from 50 wt. % to 60 wt. %, based on the total weight of the coinage cladding alloy.

3. The coinage cladding alloy of claim 1, wherein the disordered crystalline phase comprises a single phase.

4. The coinage cladding alloy of claim 3, wherein the single phase is a face-centered cubic phase.

5. The coinage cladding alloy of claim 3, wherein the electrical conductivity is produced from quenching an annealing alloy from an annealing temperature at a cooling rate effective to produce the coinage cladding alloy in the disordered crystalline phase.

6. The coinage cladding alloy of claim 5, wherein the cooling rate is greater than or equal to air cooling from the annealing temperature to room temperature.

7. The coinage cladding alloy of claim 1, wherein a yield strength of the coinage cladding alloy is from 100 MPa to 180 MPa.

8. The coinage cladding alloy of claim 1, wherein the electrical conductivity is selected such that a coin comprising the coinage cladding alloy is acceptable as currency in a vending machine that accepts the coin.

9. A process for making the post-annealed coinage cladding copper alloy for coinage of claim 1, the process comprising:

heating an alloying composition to a first temperature that is greater than or equal to an annealing temperature to form an annealing alloy, the alloying composition comprising:

nickel present in an amount from 5 wt. % to 7 wt. %, based on a total weight of the alloying composition;

zinc present in an amount from 21 wt. % to 29 wt. %, based on the total weight of the alloying composition;

manganese present in an amount from 12 wt. % to 16 wt. %, based on a total weight of the alloying composition; and copper; and quenching, by cooling the annealing alloy from the first temperature to a second temperature that is less than the annealing temperature.

* * * * *